(12) United States Patent
Allard (10) Patent No.: US 6,415,979 B1
(45) Date of Patent: Jul. 9, 2002

(54) METHOD AND APPARATUS FOR IDENTIFYING AND RECORDING VALUES ASSOCIATED WITH PLANT EQUIPMENT INSPECTION USED IN MANAGING FUGITIVE EMISSIONS

(75) Inventor: Jean-Luc Allard, Anjou (CA)

(73) Assignee: SNC-Lavalin Environment Inc., Quebec (CA)

( * ) Notice: Subject to any disclaimer, the term of this patent is extended or adjusted under 35 U.S.C. 154(b) by 0 days.

(21) Appl. No.: 09/357,702

(22) Filed: Jul. 20, 1999

Related U.S. Application Data
(60) Provisional application No. 60/123,372, filed on Mar. 8, 1999.

(51) Int. Cl.⁷ .............................................. G06K 9/00
(52) U.S. Cl. ......................... 235/462.13; 235/462.11; 324/512
(58) Field of Search ..................... 235/462.13, 462.15, 235/462.24, 462.41; 324/512, 753

(56) References Cited

U.S. PATENT DOCUMENTS

| | | | |
|---|---|---|---|
| 2,159,925 A | 5/1939 | Wood | |
| 4,974,168 A | * 11/1990 | Marx | ........................ 702/187 |
| 5,272,769 A | 12/1993 | Strnatka et al. | |
| 5,335,276 A | 8/1994 | Thompson et al. | |
| 5,356,594 A | 10/1994 | Neel et al. | |
| 5,465,401 A | 11/1995 | Thompson | |
| 5,479,359 A | 12/1995 | Rogero et al. | |
| 5,528,496 A | 6/1996 | Brauer et al. | |
| 5,650,943 A | 7/1997 | Powell et al. | |
| 5,657,460 A | 8/1997 | Egan et al. | |
| 5,737,727 A | 4/1998 | Lehmann et al. | |
| 5,828,969 A | 10/1998 | Chamney et al. | |

FOREIGN PATENT DOCUMENTS

| WO | 9708633 | * 8/1996 | ............ 235/462.13 |
|---|---|---|---|

OTHER PUBLICATIONS

US 5,870,314, 02/1999, Van Den Bosch (withdrawn)

* cited by examiner

Primary Examiner—Karl D. Frech
Assistant Examiner—Daniel St. Cyr
(74) Attorney, Agent, or Firm—Altheimer & Gray (57) ABSTRACT

Images of plant equipment are first acquired and then marked or tagged to provide reference images used during inspection of the plant equipment. The reference images provide easy guidance without requiring markers on the equipment. When inspecting fewer than all inspection points, an inspection route manager is used for selecting inspection points. A report generator provides a report with problem inspection points clearly indicated on images of the sites where problems are detected. GPS measurements of plant equipment positions are acquired when taking images, and are used to guide during general inspection and when visiting problem sites after general inspection.

19 Claims, 5 Drawing Sheets

FIG_4

FIG. 5

METHOD AND APPARATUS FOR IDENTIFYING AND RECORDING VALUES ASSOCIATED WITH PLANT EQUIPMENT INSPECTION USED IN MANAGING FUGITIVE EMISSIONS

The present application claims the benefit of priotity of U.S. provisional patent application Ser. No. 60/123,372 filed Mar. 8, 1999. The present specification includes an Appendix containing a User's Guide for the computer program entitled "DÉFI—Detection of Industrial Fugitive Emissions". Copyright to the work contained in the Appendix for the purposes of reproduction of the present specification is waived, while copyright for all other purposes is retained.

FIELD OF THE INVENTION

The invention relates to monitoring systems and more particularly to systems for monitoring fugitive emissions.

BACKGROUND OF THE INVENTION

Process equipment such as valves, pumps, compressors, pressure relief devices have to be monitored for Volatile Organic Compounds (VOC) emissions or other gaseous emissions such as ozone depleting substances, greenhouse gases, toxic substances or other compounds in chemical manufacturing operations, refineries, pharmaceutical plants and other industrial sites. Fugitive emissions are very often related to a decline in air quality. Fugitive emissions are particularly problematic since their dispersion in ambient air is much lower than for stacks. Canadian and US legislation has very precise regulations for controlling emissions such as VOC's and different systems for the managing process of fugitive emissions of volatile organic compounds into the atmosphere have been created.

The conventional method for keeping track of VOC emissions is to label all of the potentially problematic parts of the equipment on site with barcodes. These barcodes are then scanned and VOC emission measurements are taken by a technician at the precise location of the barcode. U.S. Pat. No. 5,356,594, Neel et al., is a good example of the state of the art in the field.

Neel et al. disclose a portable (handheld) volatile organic compound monitoring system for monitoring fugitive emissions using a coded identification tag. The system included a housing, a tag reader, analysis chamber structure, a sample probe coupled to the analysis chamber, and pump structure for drawing a gas sample to be analyzed through the sample probe into the analysis chamber. Ionization apparatus and storage means can be added for added functionalities. Microprocessor apparatus responsive to tag information, selected response factor information, and the sensor output signal produces an output indicative of volatile organic compound concentration at the monitored device. This system is combined with the appearance of a barcode or another identification tag on the equipment to monitor.

The process of identifying and keeping track of inspection locations is difficult, while it is of considerable importance to make sure that inspection is both complete and in accordance with a desired order or route.

The devices to be monitored are frequently located both in the field and in process plants, in sometimes inaccessible locations. The environment surrounding the equipment is often harsh and corrosive. The use of barcodes on the equipment to monitor is acceptable for as long as the barcode stays visible and accessible. In addition to taking the readings with their probes, technicians assigned to the managing A of emissions have to find the barcodes. These barcodes might have been partially or fully removed from their location on the equipment during a repair, a maintenance operation or something else, or might have become unreadable after a painting operation or a dropping of a chemical. Also, if a precise record of how many spots have to be monitored on the equipment with a description of their location is not kept, a technician can forget some readings and introduce errors in the keeping of data about the emissions. Relying on a sticker or an external identification tag can be considered weak with respect to quality standards.

OBJECTS OF THE INVENTION

It is a first object of the present invention to provide a method and an apparatus for monitoring portable volatile organic compound emissions using an image of the equipment at the site and to label and record on the image all the spots where an emission reading should be taken. The step of reading a barcode or ID tag physically placed on the equipment is then eliminated.

It is another object of the invention to provide a system and method for creating a database of inspection points referenced with respect to images, such that the database can be reviewed and created without being on site where the equipment is located.

It is another object of the invention to provide a system and method which allows for the selection, creation and planning of an "inspection route" of inspection points.

It is a further object of the invention to provide a system and method for creating a database of inspection points organized by hierarchical classes representing physical or geographic location.

It is another object of the invention to provide a system and method for collecting site inspection data in which a portable screen image of the object being inspected is provided and in which inspection point guidance and inspection data collection is integrated into a single device, whereby the process of inspection is more reliable and fast.

SUMMARY OF THE INVENTION

According to the present invention, there is provided a method of collecting site inspection data comprising:

obtaining an image of an inspection site;

providing visual markers on the inspection site image identifying a plurality of inspection points for the inspection site;

providing identification data for the inspection points;

using the inspection site image at the inspection site as a reference to locate the inspection points; and recording fugitive emission data from the inspection points in association with the point identification data.

Preferably, the inspection site image is reproduced on a sheet, and the sheet can be used at the inspection site. The identification data may also be printed on the sheet.

Preferably, the identification data printed on the sheet comprises a bar code for each of the inspection points, the step of recording comprises scanning a selected one of the bar codes associated with one of the inspection points being inspected to provide electronic entry of identification data to be associated with the one of the points into a data logger.

Preferably, a plurality of inspection site images are obtained, the inspection site covers a plurality inspection site locations, and the identification data comprises point classification data for sorting the inspection points by geographical or physical area identified at least by group. The inspection points are also associated with a single group representing a series of inspection points from equipment at a single site location.

Also preferably, the point classification data comprises a project, area, sub-area, and group identification data field, wherein a project contains one or more areas, an area contains one or more sub-areas, a sub-area contains one or more groups.

The invention also provides a step of selecting an "inspection route" subset of the inspection points according to the identification data including the point classification data, wherein the subset of the inspection points are located and fugitive emission data only for the subset of the inspection points.

Preferably, the inspection site image is a digital image, and the providing of visual markers and the providing of identification data for the inspection points comprise using a graphical user interface computer tool to position screen objects representing the visual markers on the digital image and to enter the identification data as properties of the screen objects.

According to a further preferred variant of the invention, the inspection site image is a screen display image provided by a display source driven by an inspection control computer and viewable by a user at the inspection site. The step of using the image at the inspection site may then comprise altering the screen display image to indicate which one of the plurality of the inspection points is to be inspected, and the recording of fugitive emission data may comprise automatically associating in the inspection control computer the identification data for the indicated one of the inspection points with fugitive emission data.

The inspection point identification data may also comprise geographic positioning information for the site location, eg. GPS measurement coordinates, and the portable data logger used during inspection can include a GPS receiver device for providing an indication of the user's location and thereby aid in guiding the user to the right equipment in a plant.

Once an inspection has been completed, the invention also provides for a report to be generated. Preferably, this report contains images of the equipment which are believed to be problematic. The images may be presented in the report with only the problem site markers shown for greater clarity. The images may be presented in the report along with all salient inspection point data so that the inspector is readily prepared to assess the problems. GPS information may also be used to quickly direct the inspector to the problem points. The report can thus focus attention to relatively few points within a large plant with efficient visual and/or GPS guidance directly to problem locations.

Accordingly, the invention provides method of generating an inspection report, comprising:

obtaining digital images of a plurality of inspection sites;

positioning markers on the images identifying a plurality of inspection points for the sites;

recording fugitive emission data from the points at the sites;

analyzing the fugitive emission data to determine problem ones of the points;

selecting ones of the images including the problem points;

editing the images to indicate the problem points; and outputting the inspection report including the edited images.

Conventional VOC detectors include a vapor analyzer. The present invention may make use of other forms of detectors, such as radiation detectors (e.g. in nuclear power plants), and optical imaging inspection devices, e.g. infrared cameras able to image fugitive emissions.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
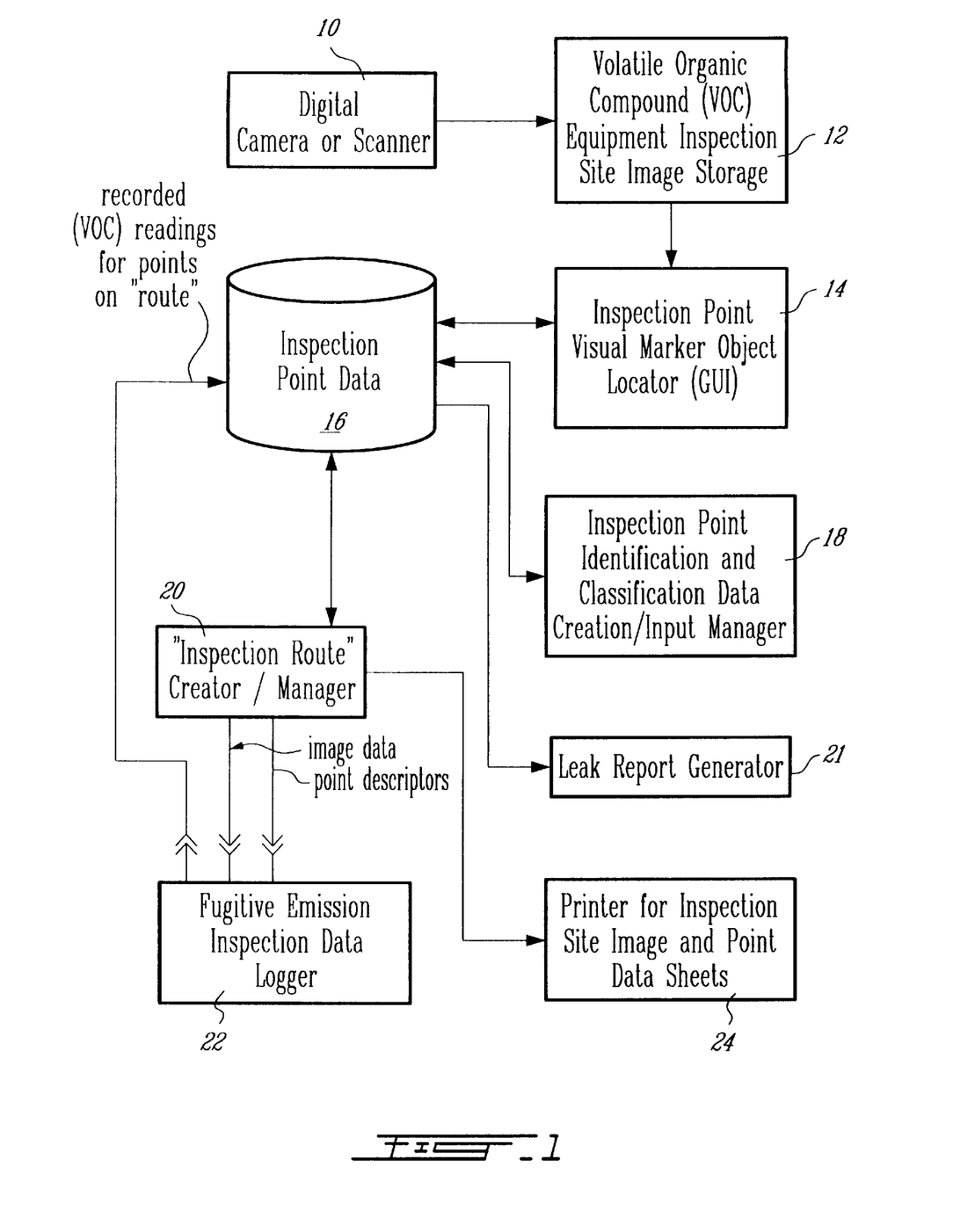
FIG. 1 is a schematic block diagram of the site inspection data collection system according to the preferred embodiment.

FIG. 1 illustrates in schematic block diagram format the computer-based system for collecting site inspection data. Although the type of inspection described herein is hydrocarbon or other volatile organic compound fugitive emission inspection in chemical processing plants, it will be apparent to those skilled in the art that the invention may be applied to other types of inspections. Digital images from a digital camera or from a scanner 10 used for scanning photographs are acquired by a user during a site visit. The images are of pieces of plant equipment, components of which are to be inspected. The location of the plant equipment is recorded, as for example using a GPS receiver. The digital images and GPS data are stored in a storage unit 12, which may be space allocated on a hard drive of a computer (not separately shown in FIG. 1).

The user prepares the images using an image marking computer tool 14 which retrieves an image selected by the user from the storage 12, and displays the image on a screen of a computer (not explicitly shown in FIG. 1). The user may crop the original image and resave the cropped image either as a new image or over the original image, in order to allow for the user the select the inspection site within the image. In the preferred embodiment, inspection points are grouped together, and an image preferably shows points from a single group, although it is possible to have a single group spread over more than one image, and more than one group in a single image. The tool 14 allows the user to select a point on the 2-dimensional image (while a 3-D image would be possible, the presently preferred embodiment uses 2-D images), and to create a reference line from the selected point to a text box. A tool 18, which may be separate from tool 14 or integrated therewith, allows the user to specify reference data for the inspection point, and either the full description or an abbreviation thereof is placed into the text box. Further details of how the point data is specified are found in Chapter 3 of the Appendix. The selected image, the coordinates of its inspection points on the image and the inspection point descriptors, along with the GPS coordinates of the site location are all saved in database 16.

In the preferred embodiment, the descriptor data comprises geographical classification identification data for the points. The geographical or physical location data contains fields identifying each points project, area, sub-area and group. Such classes provide a hierarchical structure to the data in database 16. Preferably, this data is specified for the first point to be marked in a group in an image, and then all other points marked have this identification data filled in as default values. The user is also asked to specify an equipment component type description. This descriptor may be very detailed and, for example, can classify inspection point items by generic function, such as valve, connector, filter, pressure gage, pump, etc., as well as by manufacturer name and model, and by material. For example, one may wish to inspect all items made by a particular manufacturer (perhaps because of a detection of failure and poor quality in items made by the manufacturer), or all items having a certain composition, such as polyethylene plastic (perhaps because it is discovered that an additive has been used which adversely reacts with such a plastic), or all items having a pressure tolerance rating below a particular value (when an abnormal condition caused pressure to exceed the particular value). The descriptor information also serves the purpose of basic inventory of components, and for providing the user during inspection with a description of the component in order to confirm that the correct inspection point is inspected. Likewise, the descriptor information includes information about the location to be inspected, such as upstream/downstream, top/bottom, on flange bolt, at shaft, etc.

For a detailed guide on what information can be specified, what steps can be followed, and what functions the computer program carries out according to preferred embodiment, reference may be had to the Appendix forming a part of the present specification.

Figure 2:
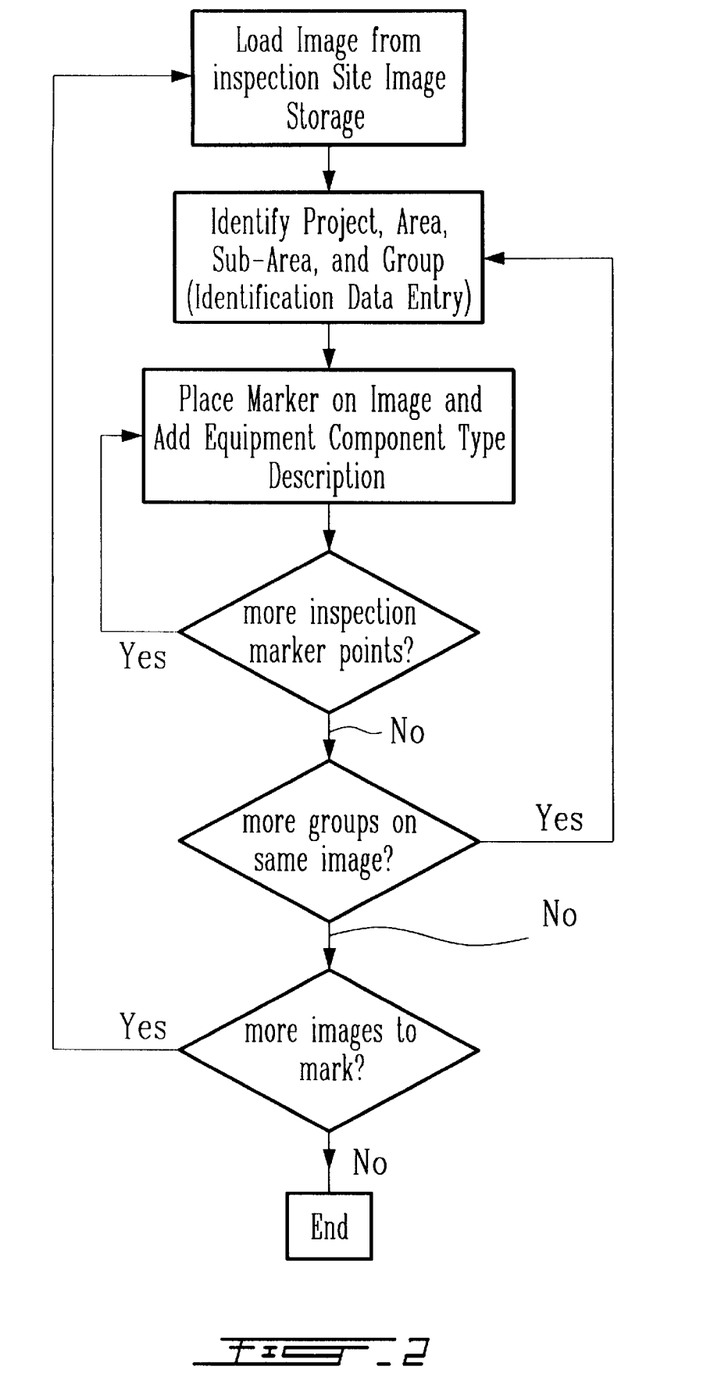
FIG. 2 is a flow chart illustrating the steps involved in the method of identifying inspection points according to the preferred embodiment.

As shown in FIG. 2, the method of placing marker objects on the image and identifying inspection points allows for a series of groups and images to be processed by the user. When all points on an image are specified, the user selects a next image until all images for a project have been specified. The database 16 preferably stores the images and the marker object data separately, while the display in the tool 14 combines the data and superposes the markers objects onto the image to provide a single marked up image.

For small numbers of inspection points, it is possible to image that all points can be inspected in a single visit. For large plants having a large number of inspection points and equipment components spread out over a large installation or plant, it becomes increasingly important to select inspection points from the database 16 which are to be inspected in a single visit or inspection run. For this purpose, the invention provides an "inspection route" creator or manager 20, as shown in FIG. 1. The tool 20 allows the user to select points by group and other location classification fields, as well as by component type. The tool 20 also allows the number of inspection points to be reduced by randomly picking certain point which are to be omitted, so as to keep the time required to inspect a site or plant within an acceptable limit. The randomly omitted points may be selected from particular types of components, so as to maintain an evenly balanced inspection of component. It is also possible not to omit any critical component inspection points in the selection process in tool 20. Further details of how a route may be defined are found in Chapter 6 of the Appendix.

Figure 3:
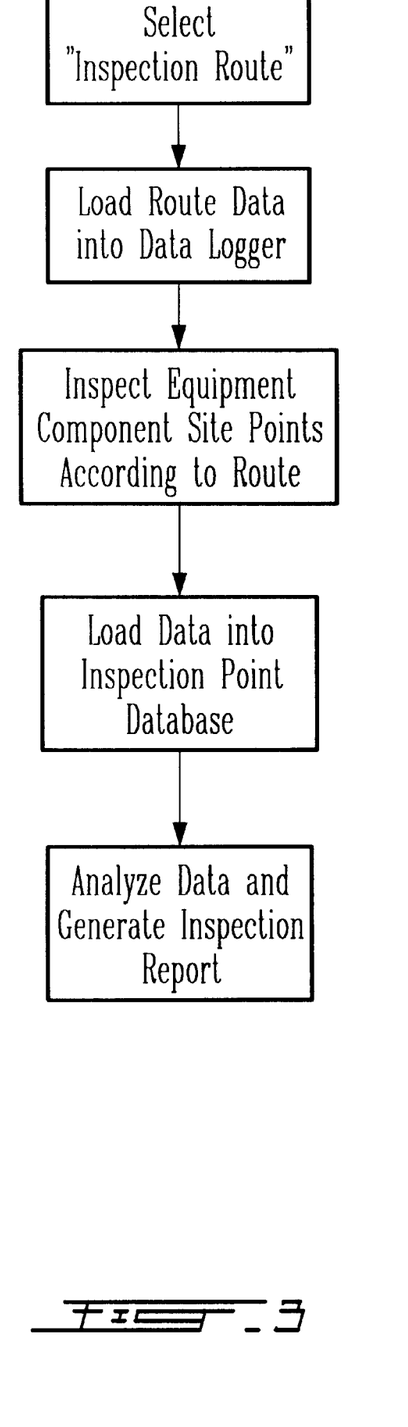
FIG. 3 is a flow chart illustrating the steps involved in the method of inspecting points according to an "inspection route" according to the preferred embodiment.

The result of the route selection in tool 20 is a data file of site location images and point location specifications. The data file is output into a logger device 22 used in the inspection process and the recorded inspection values are then uploaded from the logger 22 into the database 16. Analysis and inspection reports may then be carried out and generated by a leak report generator 21 having access to database 16. This process is illustrated in FIG. 3.

The leak report generator 21 outputs, in the preferred embodiment, a tailored report focussing on the problem points or components. A new visit to assess the problem spots may be required, and it may also be urgent. To facilitate easy location of the problem locations, the report includes images of the inspection sites with the problem inspection points clearly indicated. To improve visibility on the report images, it is possible to show only problem site markers, and thus the report generator creates its own inspection site image from the information in database 16. Therefore, from the possible hundreds or thousands of images and inspection points, the report generator can create a concise report illustrating only the relatively few problem sites. Further details on report generation are found in Chapter 7 of the Appendix. GPS information can also be provided to guide the inspector quickly to problem equipment without error. Accurate GPS devices for locating objects within a range of less than 10 m can be achieved, for example, using differential GPS.

Figure 4:
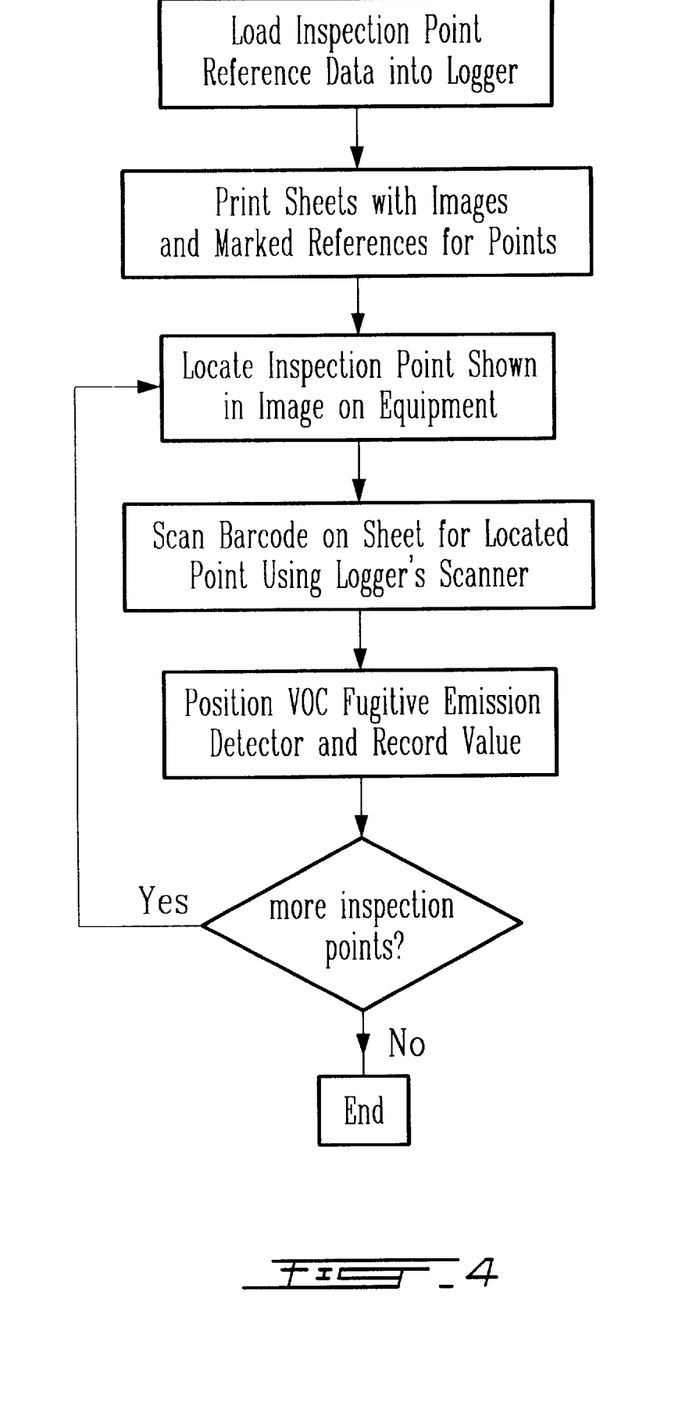
FIG. 4 is a flow chart illustrating the steps involved in using an inspection guide printout sheet for inspecting a group of points according to the preferred embodiment.

The inspection route site location data file may be output in one of two ways in the preferred embodiment. In the simplest way, the data logger 22 receives a list of inspection point reference identifiers, and a printer 24 is used to provide an inspection guide printout, which contains the site location images marked with the inspection points, as well as the basic location reference information for the inspection points. The printout in the preferred embodiment has bar code legends for each inspection point. The user inspects the equipment using a datalogger device 22, having a construction known in the art, in which a bar code scanner is provided as part of the device 22. To record an emission value for an inspection point, the user takes the bar code reader of the device 22 and scans the bar code associated with the point to the inspected, and then using the image and point descriptor text as a guide, the user takes the "sniffer wand" of the device 22 and positions the tip of the wand at the desired location to record the emission value. The device 22 records the emission value in association with the bar code identifier value, and stores the recorded value in the device's memory. The user may change printout pages (on a clipboard or the like) during the inspection process. The steps in this process are illustrated in FIG. 4.

It will be appreciated that the printout does not require bar codes, since the device 22 typically includes a display and controls for selecting and indicating a point reference number contained in its memory and loaded prior to undertaking the inspection. Thus the printout may simply contain a marked up copy of the image in such a way that the user may associate the reference numbers displayed by the device 22 with specific locations on the equipment being inspected.

Figure 5:
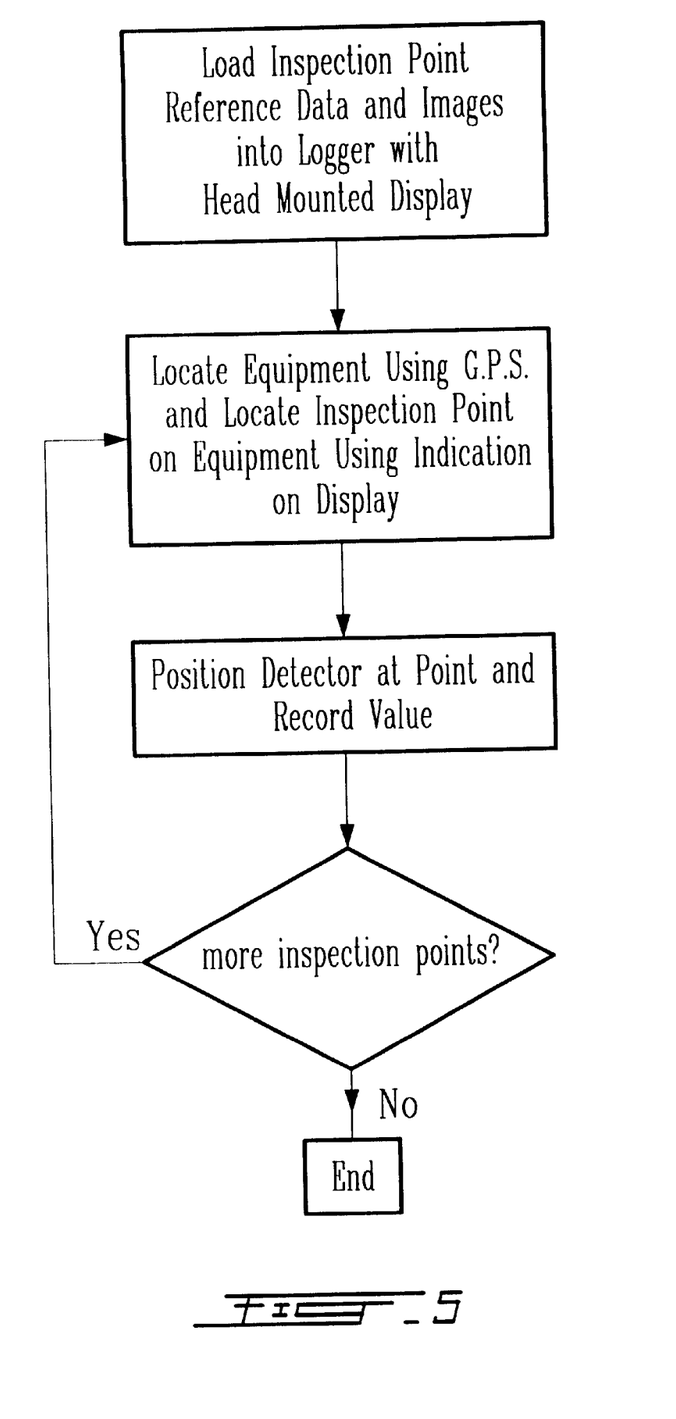
FIG. 5 is a flow chart illustrating the steps involved in using a data logger equipped with a visual display for guiding inspection.

The more sophisticated way to provide the inspection point data to the user is to provide a video display on site for the user, such as for example, a wearable video display (e.g. an LCD Head Mounted Display). Such a display can be integrated with the logger 22 such that the image is of the site is shown with the inspection point to be measured highlighted or otherwise shown. The user then point the wand to the indicated position and records the value. The logger would then advance to the next point and update the screen display accordingly. The user then continues to record values until all points in the route are recorded. The steps in this process are illustrated in FIG. 5. It will be appreciated that greater sophistication is possible, such as providing audio information to the user on the location of inspection points, as well as guidance through the inspection run, including directions or maps on how to find equipment to be inspected. The use of GPS for the logger device facilitates guidance of the user to specific equipment.

While the invention has been described above with reference to a specific preferred embodiment, it will be understood that many variations and departures from the preferred embodiment are possible and included within the scope of the appended claims.

What is claimed is:

1. A method of collecting site inspection data comprising:
   obtaining an image of an inspection site;
   providing visual markers on said image identifying a plurality of inspection points for said site;
   providing identification data for said inspection points;
   using said image at said inspection site as a reference to locate said inspection points; and
   recording fugitive emission data from said points in association with said point identification data, wherein said image is reproduced on a sheet, whereby said sheet is used at said inspection site.

2. The method as claimed in claim 1, wherein said identification data is also printed on said sheet.

3. The method as claimed in claim 2, wherein said identification data printed on said sheet comprises a bar code for each of said inspection points, said step of recording comprising scanning a selected one of said bar codes associated with one of said inspection points being inspected to provide electronic entry of identification data to be associated with said one of said points into a data logger.

4. The method as claimed in claim 3, wherein said inspection site image is a digital image, and said providing of visual markers and said providing of identification data for said inspection points comprise:
   using a graphical user interface computer tool to position screen objects representing said visual markers on said digital image and to enter said identification data as properties of said screen objects.

5. The method as claimed in claim 2, wherein said identification data comprises a textual description of an equipment component at each one of said inspection points.

6. A method of collecting site inspection data comprising:
   obtaining an image of an inspection site;
   providing visual markers on said image identifying a plurality of inspectionpoints for said site;
   providing identification data for said inspection points;
   using said image at said inspection site as a reference to locate said inspection points; and
   recording fugitive emission data from said points in association with said point identification data, wherein a plurality of inspection site images are obtained, said inspection site covering a plurality inspection site locations, said identification data comprises point classification data for sorting said inspection points by geographical or physical area identified at least by group, wherein said inspection points are associated with a single group representing a series of inspection points from equipment at a single site location.

7. The method as claimed in claim 6, wherein said point classification data comprises a project, area, sub-area, and group identification data field, wherein a project contains one or more areas, an area contains one or more sub-areas, a subarea contains one or more groups.

8. The method as claimed in claim 6, further comprising a step of:
   selecting an "inspection route" subset of said inspection points according to said identification data including said point classification data,
   wherein said subset of said inspection points are located and fugitive emission data only for said subset of said inspection points.

9. The method as claimed in claim 8, wherein said identification data includes equipment component type data for sorting said inspection points by component type, said selecting comprising selecting said subset according to equipment component type.

10. The method as claimed in claim 6, further comprising a step of:
    selecting an "inspection route" subset of said inspection points according to said identification data including said point classification data,
    wherein said subset of said inspection points are located and fugitive emission data only for said subset of said inspection points.

11. The method as claimed in claim 10, wherein said identification data includes equipment component type data for sorting said inspection points by component type, said selecting comprising selecting said subset according to equipment component type.

12. The method as claimed in claim 10, wherein said inspection site image is a screen display image provided by a display source driven by an inspection control computer and viewable by a user at said inspection site, said using said image at said inspection site comprising altering said screen display image to indicate which one of said plurality of said inspection points is to be inspected, and said recording of fugitive emission data comprising automatically associating in said inspection control computer said identification data for said indicated one of said inspection points with fugitive emission data.

13. The method as claimed in claim 12, wherein said inspection control computer automatically after each fugitive emission data recordal alters said screen display image to indicate a next one of said plurality of inspection points so as to progress through said "inspection route" subset of said inspection points.

14. The method as claimed in claim 6, wherein said inspection site images are digital images, and said providing of visual markers and said providing of identification data for said inspection points comprise:
    using a graphical user interface computer tool to position screen objects representing said visual markers on said digital images and to enter said identification data as properties of said screen objects.

15. The method as claimed in claim 14, wherein said inspection site image is a screen display image provided by a display source driven by an inspection control computer and viewable by a user at said inspection site, said using said image at said inspection site comprising altering said screen display image to indicate which one of said plurality of said inspection points represented by said screen objects is to be inspected, and said recording of fugitive emission data comprising automatically associating in said inspection control computer said identification data for said indicated one of said inspection points with fugitive emission data.

16. The method as claimed in claim 15, wherein said inspection control computer automatically after each fugitive emission data recordal alters said screen display image to indicate a next one of said plurality of inspection points so as to progress through said "4inspection route" subset of said inspection points.

17. The method as claimed in claim 6, wherein said inspection site image is a screen display image provided by a display source driven by an inspection control computer and viewable by a user at said inspection site, said using said image at said inspection site comprising altering said screen display image to indicate which one of said plurality of said inspection points is to be inspected, and said recording of fugitive emission data comprising automatically associating in said inspection control computer said identification data for said indicated one of said inspection points with fugitive emission data.

18. A method of collecting site inspection data comprising:

obtaining an image of an inspection site;

providing visual markers on said image identifying a plurality of inspection points for said site;

providing identification data for said inspection points;

using said image at said inspection site as a reference to locate said inspection points; and recording fugitive emission data from said points in association with said point identification data, wherein said inspection site image is a digital image, and said providing of visual markers and said providing of identification data for said inspection points comprise:

using a graphical user interface computer tool to position screen objects representing said visual markers on said digital image and to enter said identification data as properties of said screen objects.

19. A method of collecting site inspection data comprising:

obtaining an image of an inspection site;

providing visual markers on said image identifying a plurality of inspection points for said site;

providing identification data for said inspection points;

using said image at said inspection site as a reference to locate said inspection points; and recording fugitive emission data from said points in association with said point identification data, wherein said inspection site image is a screen display image provided by a display source driven by an inspection control computer and viewable by a user at said inspection site, said using said image at said inspection site comprising altering said screen display image to indicate which one of said plurality of said inspection points is to be inspected, and said recording of fugitive emission data comprising automatically associating in said inspection control computer said identification data for said indicated one of said inspection points with fugitive emission data.

* * * * *

UNITED STATES PATENT AND TRADEMARK OFFICE
CERTIFICATE OF CORRECTION

PATENT NO.    : 6,415,979 B1
DATED         : July 9, 2002
INVENTOR(S)   : Jean-Luc Allard

It is certified that error appears in the above-identified patent and that said Letters Patent is hereby corrected as shown below:

Column 2,
Line 2, after "managing" delete -- A --

Column 8,
Line 14, "6" should be -- 7 --
Line 27, "10" should be -- 8 --

Signed and Sealed this

Twenty-fifth Day of February, 2003

JAMES E. ROGAN
*Director of the United States Patent and Trademark Office*